United States Patent Office 2,849,288
Patented Aug. 26, 1958

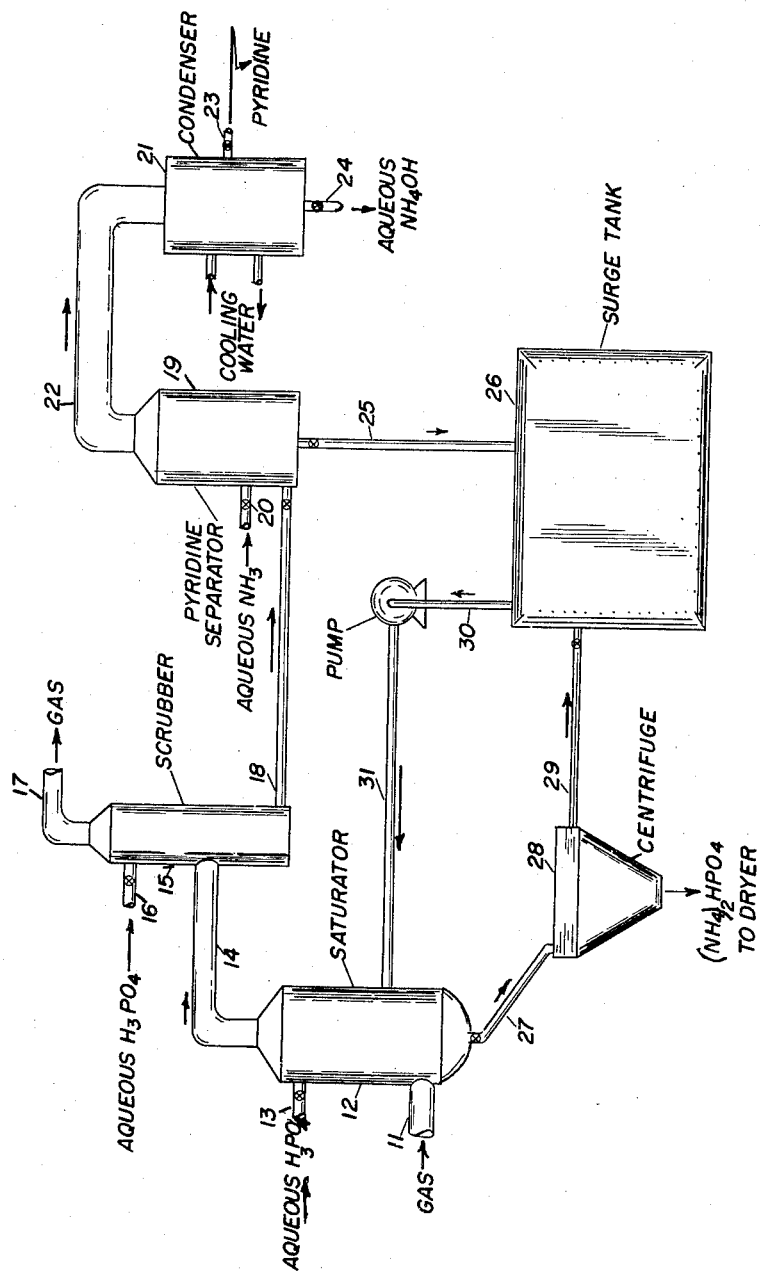

2,849,288
RECOVERY OF AMMONIA AND PYRIDINE

Robert P. Langguth, Dayton, Ohio, assignor to Monsanto Chemical Company, St. Louis, Mo., a corporation of Delaware Application September 27, 1954, Serial No. 458,558

4 Claims. (Cl. 23—107)

The present invention relates to a novel method for recovering pyridine from gaseous mixtures. More particularly, the present invention relates to a process for recovering both ammonia and pyridine from commercial coke oven gases, which contain both of such gases.

The recovery of ammonia from coke oven gases is a very old art which has been practiced industrially for many years. Until quite recently it was the almost universal practice to scrub such gases with sulfuric acid solutions to recover the ammonia in the form of ammonium sulfate. The use of phosphoric acid as a substitute for sulfuric acid in the ammonia recovery process has been suggested several times, but in the past this substitution has not been economically feasible. However, the relative costs of sulfuric and phosphoric acids and the relative market values of ammonium sulfate and ammonium phosphate salts are now such that it is commercially feasible to recover ammonia from coke oven gases with phosphoric acid.

One disadvantage arising from the use of phosphoric acid instead of sulfuric acid to recover by-product ammonia from coke oven gases is that another valuable by-product, pyridine, is not easily recovered. When sulfuric acid is utilized to produce ammonium sulfate, the pyridine is absorbed in a saturator by the same sulfate liquor in which the ammonia is absorbed, and the pyridine can be readily recovered from this liquor in a subsequent operation. However, when operating a saturator with phosphoric acid under conditions best suited for recovery of ammonium phosphates, particularly diammonium phosphate, there is substantially no absorption of pyridine from the coke oven gases. Therefore, if phosphoric acid is to be used to recover ammonia from coke oven gases and it is still desired to recover pyridine from such gases, some other method must be devised for recovering the pyridine.

Accordingly, it is an object of the present invention to provide a method for recovering pyridine from gaseous mixtures. It is a further object to provide a method for using phosphoric acid solutions to recover pyridine from gaseous mixtures, particularly gaseous mixtures (such as coke oven gases) which also contain ammonia, and from which it is desired to recover the ammonia as ammonium phosphate salts.

It has now been found that pyridine can be recovered from gaseous mixtures by absorbing said pyridine in aqueous phosphoric acid solutions having a pH below about 4, and preferably below about 3. More specifically, it has been found that phosphoric acid can be utilized to recover ammonia from coke oven gases without having to forego the recovery of pyridine from such gases.

The present invention can be better understood by reference to the accompanying drawing and the following description thereof.

Coke oven gases are led through line 11 into a saturator 12, in which there is maintained an absorbing liquor saturated with respect to ammonium phosphates. Aqueous phosphoric acid is introduced to the saturator through line 13. The conditions in the saturator are maintained in a range such that the ammonia from the coke oven gas is absorbed by the liquor and reacts with the phosphoric acid to form monoammonium or diammonium phosphate in well-defined, easily separable crystalline form which can be readily recovered from the ammonium phosphate liquor. These conditions will generally range between about 30° C. to about 70° C., and preferably between about 40° C. and about 60° C., with a pH between about 5 and about 8, depending upon whether the monoammonium or diammonium salt is to be precipitated. Most of the ammonia is removed from the coke oven gas in the saturator, but essentially all of the pyridine in said gases passes through the saturator unabsorbed.

The gases then pass through line 14 into a scrubber 15, where they are contacted with an aqueous phosphoric acid solution introduced to the scrubber through line 16. The conditions in the scrubber are controlled so that the liquid solution formed therein is maintained at a much lower pH than the saturator. Under these conditions essentially all of the pyridine in the coke oven gases and most of the ammonia which passed through the saturator are absorbed into the liquid phase in the scrubber. The remainder of the coke oven gas, now substantially free from ammonia and pyridine, passes out of the scrubber through line 17. The aqueous solution containing pyridine, ammonia and phosphoric acid passes from the scrubber, through line 18, into the pyridine separator 19 in which it is mixed with aqueous ammonia introduced to the pyridine separator through line 20. Upon mixing of the aqueous ammonia and phosphate liquor in the pyridine separator 19, the temperature of the mixture is raised somewhat by exothermic reaction. This elevated temperature, along with a partial vacuum caused by the condenser 21, causes essentially all of the pyridine, a little of the ammonia and some of the water to vaporize in the separator 19 and pass through line 22 to the condenser 21, wherein the vapors are condensed. Addition of a salt, or other highly dissociable source of ions, as described more fully below will cause the mixture to separate into an upper phase comprising pyridine and a lower phase comprising aqueous ammonia and the electrolyte. The two liquid phases are withdrawn from the condenser through lines 23 and 24, respectively.

The pyridine free liquor remaining in the pyridine separator is withdrawn from the separator through line 25 and passed to a liquor surge tank 26.

A slurry of crystalline ammonium phosphate in ammonium phosphate liquor saturated with respect to said ammonium phosphate is withdrawn from the saturator 12 through line 27 and passed through a centrifuge 28, wherein the bulk of the liquor is removed from the crystalline product and passed through line 29 to the surge tank 26. The moist crystalline ammonium phosphate is passed from the centrifuge to a dryer to remove the remainder of the liquid from said crystals. The liquor from the surge tank 26 is recycled to the saturator by pumping through lines 30 and 31.

It will be noted that the key portions of the above-described process are (a) absorption of the pyridine in phosphoric acid and (b) regeneration of the free pyridine by reaction with a base, such as ammonium hydroxide.

In order to effectively utilize liquid phosphoric acid to absorb pyridine, it is necessary that the liquid-phase be maintained at a pH less than about 4.0, and preferably less than about 3.0. The temperature at which this absorption is carried out is relatively unimportant, the absorption taking place readily at around normal room temperatures or at higher or lower temperatures—although it will be quite apparent that somewhat more complete absorption will be obtained at lower temperatures than at temperatures approaching the normal boiling point of the absorbent liquid. The concentration of the phosphoric acid in which the pyridine is absorbed is also of relatively little importance, although the fact that the pH must be maintained below 4.0 inherently places a limitation upon the use of extremely dilute phosphoric acid solutions.

Regeneration of the free pyridine by reaction with ammonia (or a comparable base) must be carried out at a pH in excess of 4.0, and preferably greater than about 5.0. Bases other than ammonia which can be utilized to regenerate pyridine at a pH in excess of 4.0 are the various inorganic bases, e. g., potassium hydroxide, sodium hydroxide, lithium hydroxide, etc., organic quaternary ammonium compounds, e. g., tetramethylammonium hydroxide, tetraethylammonium hydroxide and higher homologues thereof, aliphatic or cycloaliphatic amines, e. g., mono-, di-, and trimethyl amine, diethyl amine, diisopropyl amine, mono- and di-cyclohexyl amine, and higher homologues thereof, guanidine, or any other base having a basicity as great or greater than ammonia.

The separation and/or recovery of pyridine from the foregoing reaction mixtures (of any one or more of the various possible bases) can be accomplished in various ways, the choice depending, inter alia, upon how complete a recovery of pyridine is desired or required. It is, of course, well known that pyridine is soluble in all proportions with water. The same is true of pyridine in phosphoric acid solutions. However, pyridine has a limited solubility in aqueous solutions of salts. In such solutions, the solubility of pyridine decreases quite rapidly both with respect to increasing salt concentration and with respect to increasing alkalinity. For example, if pyridine is mixed with a saturated solution of monoammonium phosphate at 25° C., and the pH of the mixture is adjusted by addition of ammonium hydroxide to a value of 6.0, the solubility of the pyridine in the solution will be about 14 percent by weight. However, if the pH is adjusted to 7.8 instead of 6.0, the solubility of pyridine is reduced to less than ½ percent by weight.

The result of reacting ammonia or an equivalent base with the pyridine-phosphoric acid solution will be to form an aqueous salt solution (of ammonium phosphate salts) and to raise the pH of the solution—both of which will decrease the solubility of the pyridine in the aqueous solution and cause the formation of a separate non-aqueous phase comprising the pyridine. The pyridine phase readily forms as a separate layer on top of the aqueous phase, from which it can be readily drawn off.

It will be noted that the more ammonia (or equivalent base) that is utilized, the higher will be the resulting pH of the solution. This will in turn result in a lower solubility of pyridine in the solution and give a better recovery of pyridine in the non-aqueous phase. However, in a process such as illustrated in the attached drawing the ammonium phosphate liquor coming from the pyridine separator is to be recycled to the saturator—to avoid the loss of phosphate which would result if the liquor were discarded. Since the saturator is operated at a controlled pH, recycle thereto of an ammonium phosphate liquor of higher pH would require that a larger quantity of phosphoric acid be added to the saturator to maintain the pH in the proper range. Thus, any advantage of greater pyridine recovery resulting from an increase in pH in the pyridine separator may be at least partially offset by an increased requirement for phosphoric acid in the saturator.

Fortunately, there is another way to effect a high recovery of pyridine from the pyridine separator (other than increasing the pH of the pyridine separator solution above that of the saturator solution). The relative vapor pressures of the various components in the pyridine separator are such that if the temperature thereof is raised and/or the total pressure therein reduced, essentially all of the pyridine will vaporize (along with a little of the water and ammonia), but essentially all of the phosphates will remain in the pyridine separator. Condensation of the foregoing vapors will give a liquid from which pyridine can be readily salted out by substantially increasing the concentration of ions in the solution while still maintaining the solution basic or only weakly acidic—i. e., above a pH of about 5.5 or preferably above 7. The pyridine is preferably salted out with alkaline or neutral salts (e. g., salts of strong acids and strong basis, of weak acids and weak bases, or of weak acids and strong bases), since such salts will not tend to decrease the alkalinity of the solution. Acidic salts can also be used, either alone or with additional base, provided the pH is not lowered to a point where the pyridine is converted to pyridinium ions. Likewise, highly dissociable bases, such as sodium or potassium hydroxide, quaternary ammonium compounds, and the like, can be used as a suitable source of ions for salting out the pyridine from the aqueous solution with ammonia and water.

A particularly attractive manner in which the foregoing separation can be achieved is to include some ammonium carbonate in the aqueous ammonia used to regenerate free pyridine from the pyridine solution in phosphoric acid. In this way, carbon dioxide will be released in the pyridine separator and will distill over into the condenser with the ammonia, water vapor, and pyridine, thus forming an ammonium carbonate solution on condensing.

Mono- and diammonium phosphates (as well as mixtures thereof) have a relatively limited solubility in aqueous solution. If the concentration of such phosphates exceeds the saturation limit at any point of the aforedescribed pyridine recovery process, there will be a strong tendency for such phosphates to precipitate as a solid upon the walls of the equipment, to cause clogging of lines, and otherwise to generally interfere with the smooth separation and recovery of pyridine from the reactant solution. Thus, it will generally be desirable to maintain the ammonia and phosphoric acid concentrations below the saturation level. The saturation concentration is a function of both pH and temperature, as will be seen from the following Table I.

TABLE I

Saturation concentration of ammonium phosphates, in gr./100 cc. of water

| pH | Temperature | | |
|---|---|---|---|
| | 25° C. | 50° C. | 75° C. |
| 1.35 | ∞ | ∞ | ∞ |
| 2.50 | 90 | 120 | 155 |
| 4.35 | 40 | 70 | 110 |
| 6.90 | 130 | 190 | 290 |
| 7.80 | 60 | 90 | 100 |

It will be noted that the solubility is very high in highly acidic (essentially 100% phosphoric acid) solutions, decreases quite rapidly with increasing alkalinity to a minimum value at a pH of about 4.35 (composition of monoammonium phosphate), goes through a region of higher solubility with a maximum at a pH of about 6.9, then decreases again to another minimum value at a pH of about 7.8 (composition of diammonium phosphate).

From the foregoing it is apparent that there are numerous opportunities in the present process to exceed the saturation concentration of ammonium phosphates. Thus, if too much ammonia is allowed to pass through the saturator without absorption, if the phosphoric acid concentration added to the scrubber is too concentrated, or if the aqueous ammonia added to the pyridine separator is too concentrated, then (depending also upon the pH and temperature of the solutions) precipitation may result. This precipitation can be avoided, or at least minimized by readjusting concentrations, temperatures, and/or pH values pursuant to the information in the above Table I.

The following example illustrates in detail a typical process for recovering ammonia and pyridine from coke oven gases, utilizing phosphoric acid instead of sulfuric acid.

EXAMPLE

About 1,300,000 standard cubic feet per hour of coke oven gas (analysis in Table II, below) are fed to a saturator maintained at a pH of about 6.5 and a temperature of about 50° C.

TABLE II

*Coke oven gas analysis*

| Component: | Concentration |
| --- | --- |
| $H_2$ | 50 vol. percent. |
| $CH_4$ | 29.7 vol. percent. |
| CO | 6.5 vol. percent. |
| $N_2$ | 4.5 vol. percent. |
| $CO_2$ | 2.6 vol. percent. |
| Illuminants | 2.1 vol. percent. |
| $O_2$ | 0.3 vol percent. |
| $NH_3$ | 6#/10,000 s. c. f. |
| Pyridine | 0.27#/10,000 s. c. f. |
| $H_2O$ | 15#/10,000 s. c. f. |

The condensed phase in the saturator is a slurry of diammonium phosphate crystals in a saturated liquor. The liquor contains about 12.5 weight percent ammonia, 41 weight percent $H_3PO_4$, and 46.5 weight percent $H_2O$. In addition to the coke oven gases, there is fed into the saturator about 2,750 pounds per hour of 75 percent phosphoric acid and about 30,900 pounds per hour of ammonium phosphate recycle liquor from a liquor surge tank. The composition of the recycle liquor is about 10.7 weight percent $NH_3$, 35.1 weight percent $H_3PO_4$, and 54.2 weight percent $H_2O$. About 89 percent of the ammonia in the coke oven gas is absorbed in the saturator. The remainder of the ammonia, and essentially all of the pyridine originally in the gas, pass out of the saturator as a gaseous phase and are sent to a scrubber.

About 28,200 pounds per hour of slurry (about 12 weight percent diammonium phosphate and 88 weight percent liquor) are withdrawn from the bottom of the saturator and passed to a centrifuge which produces about 3600 pounds per hour of moist diammonium phosphate product (about 94 weight percent solids and 6 weight percent liquor), which is sent to a dryer for further removal of the liquid. The liquor (about 24,600 pounds per hour) separated from the solids in the centrifuge is sent to a liquor surge tank for recycle to the saturator.

The gases from the saturator are contacted in a scrubber with about 990 pounds per hour of 75 percent phosphoric acid to produce a liquid having a pH of about 1.75 and a composition of about 0.6 weight percent pyridine, 1.5 weight percent ammonia, 13 weight percent phosphoric acid and 84.9 weight percent water. The temperature of the scrubber is maintained between about 30 and about 35° C. About 5690 pounds per hour of liquid are removed from the scrubber and passed to the pyridine separator.

The pyridine separator is operated at a pH of about 6.9 and a temperature of about 50° C., by introducing a little more than 570 pounds per hour of 25 percent aqueous ammonia at about 90° C., saturated with ammonium carbonate. The pyridine separator is maintained under reduced pressure at about 60 to 70 mm. of Hg by continuously passing the vapors from the separator to a condenser. The recovery of pyridine in the condenser is essentially complete, yielding about 55 pounds per hour of pyridine. About 6100 pounds per hour of ammonium phosphate liquor analyzing about 3.7 weight percent ammonia, 12 weight percent $H_3PO_4$ and 84.3 weight percent $H_2O$ is withdrawn from the bottom of the pyridine separator and passed to the liquor surge tank for recirculation to the saturator.

I claim:

1. The method of recovering ammonia and pyridine from coke oven gases, said ammonia being recovered as diammonium orthophosphate, which method comprises passing said gases through a first absorbing zone in contact with an aqueous phosphoric acid solution saturated with respect to diammonium orthophosphate and maintained at a pH between about 5 and about 8 to remove a predominant proportion of the ammonia from said gases and to precipitate diammonium orthophosphates from said solution, passing the gases from the first absorbing zone into a second absorbing zone in contact with an aqueous phosphoric acid solution maintained at a pH below about 3.0 to remove a predominant proportion of said pyridine and a predominant proportion of the remaining ammonia, and thereafter passing ammonia into the solution formed in the second absorbing zone, thereby causing separation of a non-aqueous phase comprising pyridine.

2. The method of recovering ammonia and pyridine from coke oven gases, said ammonia being recovered as diammonium orthophosphate, which method comprises passing said gases through a first absorbing zone in contact with an aqueous phosphoric acid solution maintained at a pH between about 5 and about 8 to remove a predominant proportion of the ammonia from said gases and to form diammonium orthophosphate in said solution, passing the gases from the first absorbing zone into a second absorbing zone in contact with an aqueous phosphoric acid solution maintained at a pH below about 4 to remove a predominant proportion of said pyridine and a predominant proportion of the remaining ammonia, and thereafter recovering the pyridine from said solution.

3. The method of recovering ammonia and pyridine from coke oven gases, said ammonia being recovered as diammonium orthophosphate, which method comprises passing said gases through a first absorbing zone in contact with an aqueous phosphoric acid solution maintained at a pH between about 5 and about 8 to remove a predominant proportion of the ammonia from said gases and to form diammonium orthophosphate in said solution, passing the gases from the first absorbing zone into a second absorbing zone in contact with an aqueous phosphoric acid solution maintained at a pH below about 4 to remove a predominant proportion of said pyridine and a predominant proportion of the remaining ammonia, and thereafter recovering the pyridine by vaporization thereof from said solution.

4. The method of recovering ammonia and pyridine from coke oven gases, said ammonia being recovered as diammonium orthophosphate, which method comprises passing said gases through a first absorbing zone in contact with an aqueous phosphoric acid solution maintained at a pH between about 5 and about 8 to remove a predominant proportion of the ammonia from said gases and to form diammonium orthophosphate in said solution, passing the gases from the first absorbing zone into a second absorbing zone in contact with an aqueous phosphoric acid solution maintained at a pH below about 4 to remove a predominant proportion of said pyridine and a predominant proportion of the remaining ammonia, and thereafter adding to said solution a sufficient amount of a base to raise the pH thereof to at least about 5, thereby causing separation of a non-aqueous phase comprising pyridine.

References Cited in the file of this patent

UNITED STATES PATENTS

| Number | Name | Date |
|---|---|---|
| 1,274,998 | Dodge et al. | Aug. 6, 1918 |
| 2,309,324 | McAllister et al. | Jan. 26, 1943 |
| 2,311,134 | Schutt | Feb. 16, 1943 |
| 2,350,447 | Cole et al. | June 6, 1944 |
| 2,408,975 | Engel | Oct. 8, 1946 |
| 2,410,906 | Stewart | Nov. 12, 1946 |
| 2,435,663 | Wells et al. | Feb. 10, 1948 |
| 2,671,008 | Gollmar | Mar. 2, 1954 |

FOREIGN PATENTS

| Number | Country | Date |
|---|---|---|
| 145,799 | Australia | Mar. 19, 1952 |